(12) United States Patent
Yamamoto et al.

(10) Patent No.: US 7,664,353 B2
(45) Date of Patent: Feb. 16, 2010

(54) OPTICAL WAVEGUIDE STRUCTURE INCLUDING AT LEAST FIRST, SECOND AND THIRD WAVEGUIDES AND COUPLING WAVEGUIDE (75) Inventors: Rei Yamamoto, Tsukuba (JP); Nobuo Miyadera, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 10/544,686

(22) PCT Filed: May 13, 2004

(86) PCT No.: PCT/JP2004/006805

§ 371 (c)(1),
(2), (4) Date: Aug. 5, 2005

(87) PCT Pub. No.: WO2004/102238

PCT Pub. Date: Nov. 25, 2004

(65) Prior Publication Data

US 2006/0140540 A1 Jun. 29, 2006

(30) Foreign Application Priority Data

May 16, 2003 (JP) .............................. 2003-139247

(51) Int. Cl.
G02B 6/26 (2006.01)
(52) U.S. Cl. .......................................... 385/45; 385/43
(58) Field of Classification Search .................. None
See application file for complete search history.

(56) References Cited

U.S. PATENT DOCUMENTS 5,438,640 A * 8/1995 Sasaoka et al. ............... 385/43

(Continued)

FOREIGN PATENT DOCUMENTS

| JP | 04-213407 | 8/1992 |
| JP | 2809517 B2 | 8/1992 |
| JP | 2000-066045 | 3/2000 |
| JP | 2003-207663 A | 7/2003 |
| JP | 2003-294963 | 10/2003 |

OTHER PUBLICATIONS

Klekamp et al "An Improved Single-Mode Y-Branch Design for Cascaded 1:2 Splitters". Journal of Lightwave Technology, vol. 14, No. 12. Dec. 1996. pp. 2684-2686.*

(Continued)

Primary Examiner—Frank G Font
Assistant Examiner—Peter Radkowski
(74) Attorney, Agent, or Firm—Antonelli, Terry, Stout & Kraus, LLP.

(57) ABSTRACT

The present invention disclosed is an optical waveguide structure that has a first waveguide provided with the opposite ends A and B, a second waveguide with the opposite ends C and D, a third waveguide with the opposite ends E and F, and a coupling waveguide having its first beam incoming/outgoing end connected to the end B of the first waveguide and its second beam incoming/outgoing end connected to the end C of the second waveguide and the end E of the third waveguide. The optical waveguide is characterized in that the first waveguide and the coupling waveguide are longitudinally dimensioned so that light beam at its peak of light intensity can transit the point of axial mal-alignment at the end A of the first waveguide and further transit the axial zone at the second beam incoming/outgoing end of the coupling waveguide.

36 Claims, 3 Drawing Sheets

U.S. PATENT DOCUMENTS

| | | | |
|---|---|---|---|
| 5,745,619 A * | 4/1998 | Li et al. ................... | 385/48 |
| 5,799,119 A * | 8/1998 | Rolland et al. ............ | 385/28 |
| 6,222,966 B1 * | 4/2001 | Khan et al. ............... | 385/45 |
| 6,236,784 B1 * | 5/2001 | Ido .......................... | 385/45 |
| 6,463,188 B1 * | 10/2002 | Takahashi et al. ......... | 385/14 |
| 6,553,164 B1 * | 4/2003 | Ono et al. ................. | 385/45 |
| 6,633,703 B2 * | 10/2003 | Katayama ................. | 385/37 |
| 6,643,432 B2 * | 11/2003 | Bouda ...................... | 385/43 |
| 6,647,184 B2 * | 11/2003 | Ukechi et al. ............. | 385/47 |
| 6,728,438 B2 * | 4/2004 | Kwang Bae ............... | 385/28 |
| 6,768,842 B2 * | 7/2004 | Bulthuis et al. ........... | 385/37 |
| 6,888,985 B2 * | 5/2005 | Hosoi ....................... | 385/37 |
| 6,892,008 B2 * | 5/2005 | Singh et al. ............... | 385/49 |
| 7,006,734 B2 * | 2/2006 | Zheng et al. .............. | 385/45 |
| 7,046,881 B2 * | 5/2006 | Sakuma et al. ............ | 385/45 |
| 7,343,070 B2 * | 3/2008 | Van Der Vliet et al. .... | 385/43 |
| 2002/0159703 A1 * | 10/2002 | McGreer ................... | 385/43 |
| 2003/0021536 A1 * | 1/2003 | Sakuma et al. ............ | 385/45 |
| 2003/0202746 A1 * | 10/2003 | Hanashima ................ | 385/45 |
| 2004/0008944 A1 * | 1/2004 | Johannessen et al. ...... | 385/45 |
| 2004/0114860 A1 * | 6/2004 | Dultz et al. ................ | 385/31 |
| 2005/0041925 A1 * | 2/2005 | Takahashi et al. ......... | 385/45 |
| 2005/0069258 A1 * | 3/2005 | Zheng et al. .............. | 385/45 |
| 2005/0207705 A1 * | 9/2005 | Laurent-Lund ............ | 385/45 |

OTHER PUBLICATIONS

Official Action, for Application No. 2005-506245, mailed Dec. 11, 2006.

A. Klekamp, et al, Journal of Lightwave Technology, vol. 14, No. 12, Dec. 1996, p. 2684-2686.

Japanese Official Action, dated Jun. 12, 2006, for Japanese Patent Application No. 2005-506245.

A. Klekamp, et al., "An Improved Single-Mode Y-Branch Design for Cascaded 1:2 Splitters", *Journal of Lightwave Technology*, vol. 14, No. 12, Dec. 1996.

* cited by examiner

OPTICAL WAVEGUIDE STRUCTURE INCLUDING AT LEAST FIRST, SECOND AND THIRD WAVEGUIDES AND COUPLING WAVEGUIDE

BACKGROUND OF THE INVENTION

The present invention relates to a waveguide structure, and more particularly, it relates to a waveguide structure capable of highly unifying a branching ratio and a coupling ratio.

Broadly prevailing PCs and Internet services for recent years have spurred the market to be active due to rapidly increased needs for transmission of bulk data, and in order to meet the needs, there are further needs for optical waveguides of higher beam propagating speed and reduced optical transmission loss. The optical waveguide is used as an optical interconnection for optical transmission, and an optical device such as a beam splitter (i.e., coupler) is essential as one of the basic components of the optical waveguide. The beam splitter serves as a combining waveguide (coupler) when reversed in the direction of light transmitted therethrough.

The branching waveguide is sometimes used with other waveguide(s) and fiber(s) connected thereto. In such a case, imprecision in manufacturing the products is prone to yield a light receiving waveguide of which the axis is out of alignment with the incident beam. Under the situation, a point of the peak of light intensity is varied, and resultantly, this brings about a varied branching ratio of the branching optical waveguide connected to the light receiving waveguide. Such a variation in the peak point of the light intensity is supposed to be caused by interference with high-order modes other than the basic mode that are excited within the optical waveguide because of the maladjustment of the axis. In general, the prior art branching optical waveguide is configured to take advantage of a property that the high-order modes are less effective in confining beams within the optical waveguide.

A first embodiment of the prior art branching waveguide has a configuration functioning to attenuate the variation in the peak point of light intensity by using a long straight light receiving waveguide.

A second embodiment of the prior art branching waveguide has a configuration including a light receiving waveguide along with a curved waveguide (see FIG. 12 and the descriptions of the same in Patent Document 1).

A third embodiment of the prior art branching waveguide is configured having a light receiving waveguide partially squeezed in shape. See FIG. 14 and the descriptions referred to the same in Japanese Patent No. 2809517.

The first, second and third prior art embodiments of the branching waveguide tend to attenuate the variation in the peak point of light intensity with the aid of radiations in the high-order mode, and this leads to an adverse effect of increased radiation loss. The first embodiment of the branching waveguide must be inadvertently long because of its configuration with the long straight light receiving waveguide for radiating beams in the high-order mode.

The second and third embodiments of the branching waveguide, although partially modified in waveguide shape and advantageous in radiating beams in high-mode so as to weaken the beam confining effect, still adversely radiate beams in the basic mode due to the modified shape of the waveguide. In order not to let the shape modified optical waveguide radiate beams in the basic mode, the contour of the shaped portion must be consistently gradual in terms of the direction of the beam propagation, and this results in an undesirably long structure of the waveguide. In either case, there is a common problem that the radiation loss becomes greater, and/or the longitudinal dimension is increased. As was mentioned above, the first embodiment of the prior art branching waveguide requires the long straight light receiving waveguide, and this is the cause to make the resultant waveguide product longer.

The present invention is made to overcome the aforementioned disadvantages of the prior art branching waveguides, and accordingly, it is an object of the present invention to provide a waveguide structure capable of facilitating to fabricate its parts and guaranteeing simple assembly/adjustment of the parts for stable final products.

It is another object of the present invention to provide a waveguide structure that enables full compensation for a deviation of the peak in the field distribution, that is superior in reproducibility but reduced in beam loss, and that can unify the branching ratio with greater accuracy.

It is still another object of the present invention to provide a waveguide structure that facilitates production of the waveguide without providing the waveguide with a contoured portion such as is squeezed in shape, and that radiates reduced beams in the high-order mode to decrease the radiation loss.

Figure 2:
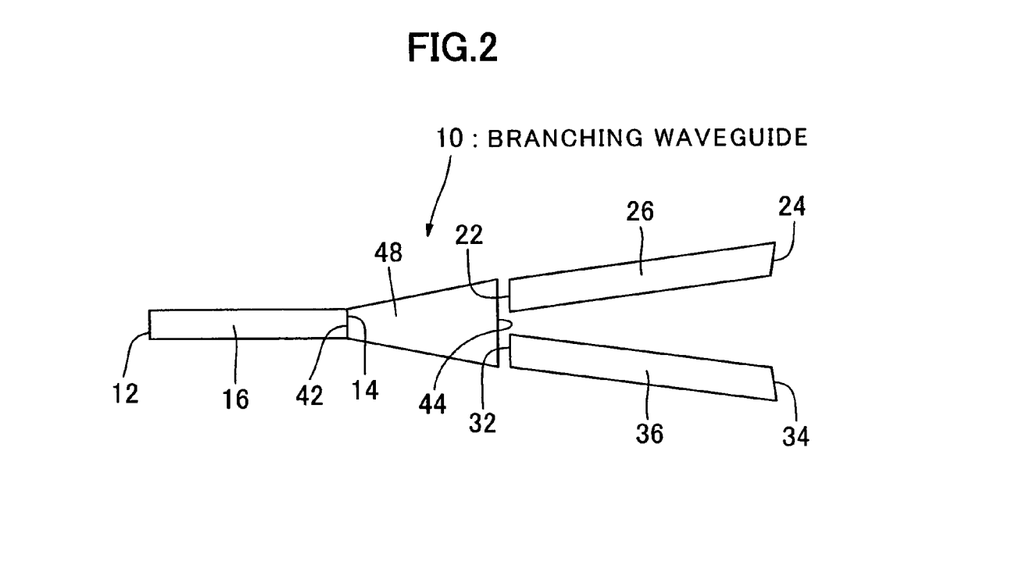
FIG. 2 is a diagram of the embodiment of the optical waveguide structure according to the present invention, showing waveguide components spaced apart from each other.

Throughout the specification, the term "connection/connecting" means optical coupling as in FIG. 2 where there may be a groove and gaps in the junction plane. The terms "axial zone" at a second beam incoming/outgoing end mean an area that covers a zone lower than a half of the amplitude of the oscillation, preferably, one third of the amplitude, and more preferably, one quarter of the amplitude in the case where the center of second and third waveguides is the center of oscillation in view of the peak point of beam intensity.

Also, the terms "the difference of refractive index" means a value given by the formula $$\frac{n_1^2 - n_2^2}{2n_1^2}$$

where $n_1$ is a refractive index of the core and $n_2$ is that of the cladding layer.

SUMMARY OF THE INVENTION

The present invention is directed to an optical waveguide structure that has a first waveguide provided with the opposite ends A and B, a second waveguide with the opposite ends C and D, a third waveguide with the opposite ends E and F, and a coupling waveguide having its first beam incoming/outgoing end connected to the end B of the first waveguide and its second beam incoming/outgoing end connected to the end C of the second waveguide and the end E of the third waveguide.

The optical waveguide is characterized in that the first waveguide and the coupling waveguide are longitudinally dimensioned so that a light beam at its peak of light intensity can transit the point of axial mal-alignment at the end A of the first waveguide and further transit the axial zone at the second beam incoming/outgoing end of the coupling waveguide.

The optical waveguide structure according to the present invention is also characterized in that the first waveguide and the coupling waveguide are respectively longitudinally dimensioned so that the light beam of which wavelength is the shortest of all the available, when it is at its peak, can transit a point of axial mal-alignment at the end A of the first waveguide and further transit the axial zone at the second beam incoming/outgoing end of the coupling waveguide.

The present invention is directed to the optical waveguide structure also characterized in that the longitudinal extension of the first waveguide is defined by the following equations:

when $L_t$=450 μm, $W_t$=16 μm, and the difference of the refractive
index of the core from that of the cladding layer equals 0.4%, $$L_s=N(10.6W_s+147)+6.4 \ (N=1,2,3,\ldots)$$

where $W_s$ and $L_s$ are respectively a core width and a length of the first waveguide, $L_t$ is a length of the coupling waveguide, and $W_t$ is a width of the core of the second beam incoming/outgoing end.

The optical waveguide structure according to the present invention is characterized by functioning as a branching waveguide.

The optical waveguide structure according to the present invention is characterized by functioning as a combining waveguide.

The optical waveguide structure according to the present invention is characterized by being configured as a resin waveguide.

The optical waveguide structure according to the present invention is characterized by including a waveguide substrate with a V-shaped groove(s) defined therein.

The optical waveguide structure according to the present invention is characterized in that the first waveguide and the coupling waveguide are longitudinally dimensioned so that a light beam of either a first or second wavelength, when it is at its peak of light intensity, can transit the point of axial mal-alignment at the end A of the first waveguide and further transit the axial zone at the second beam incoming/outgoing end of the coupling waveguide.

The optical waveguide structure according to the present invention is characterized in that the first waveguide is greater in core width than the second and third waveguides.

The present invention is directed to the optical waveguide structure also characterized in that the longitudinal extension of the first waveguide is defined by the following equations:

when $L_t$=450 μm and the difference of the refractive index of the core from that of the cladding layer equals 0.4%, $$L_s=N(10.6W_s+147)-12.6W_t+208 \ (N=1,2,3,\ldots)$$

where $W_s$ and $L_s$ are respectively a core width and a length of the first waveguide, $L_t$ is a length of the coupling waveguide, and $W_t$ is a width of the core of the second beam incoming/outgoing end.

Also, the present invention is directed to the optical waveguide characterized in that the total longitudinal extension of the first waveguide and the coupling waveguide is given by the following equations:

when the difference of the refractive index of the core from that of the cladding layer equals 0.4%, $$L=N(10.6W_s+147)-12.6W_t+658 \ (N=1,2,3,\ldots) \text{ and}$$

$$L=L_s+L_t$$

where $W_s$ and $L_s$ are respectively a core width and a length of the first waveguide, $L_t$ is a length of the coupling waveguide, and $W_t$ is a width of the core of the second beam incoming/outgoing end.

The present invention is directed to the optical waveguide also characterized in that the longitudinal extension of the first waveguide is defined by the following equations:

when $L_t$=450 μm, $W_t$=16 μm, and the difference of the refractive
index of the core from that of the cladding layer equals 0.4%, $$L_s=N(32.5W_s^2-415W_s+1540)+6.4 \ (N=1,2,3,\ldots)$$

where $W_s$ and $L_s$ are respectively a core width and a length of the first waveguide, $L_t$ is a length of the coupling waveguide, and $W_t$ is a width of the core of the second beam incoming/outgoing end.

The present invention is further directed to the optical waveguide characterized in that the longitudinal extension of the first waveguide is given by the following equations:

when $L_t$=450 μm and the difference of the refractive index of the core from that of the cladding layer equals 0.4%, $$L_s=N(32.5W_s^2-415W_s+1540)-12.6W_t+208 \ (N=1,2,3,\ldots)$$

where $W_s$ and $L_s$ are respectively a core width and a length of the first waveguide, $L_t$ is a length of the coupling waveguide, and $W_t$ is a width of the core of the second beam incoming/outgoing end.

Furthermore, the present invention is directed to the optical waveguide characterized in that the total longitudinal extension of the first waveguide and the coupling waveguide is given by the following equations:

when the difference of the refractive index of the core from that of the cladding layer equals 0.4%, $$L=N(32.5W_s^2-415W_s+1540)-12.6W_t+658$$
$$(N=1,2,3,\ldots) \text{ and}$$

$$L=L_s+L_t$$

where $W_s$ and $L_s$ are respectively a core width and a length of the first waveguide, $L_t$ is a length of the coupling waveguide, and $W_t$ is a width of the core of the second beam incoming/outgoing end.

The present invention is also directed to an optical waveguide structure that has a first non-linear waveguide provided with the opposite ends A and B, a second non-linear waveguide with the opposite ends C and D, a third non-linear waveguide with the opposite ends E and F, and a coupling waveguide having its first beam incoming/outgoing end connected to the end B of the first waveguide and its second beam incoming/outgoing end connected to the end C of the second waveguide and the end E of the third waveguide, the optical waveguide being characterized in that the coupling waveguide has its longitudinal extension dimensioned so that a light beam at its peak of light intensity can transit the point of axial mal-alignment at the first beam incoming/outgoing end and further transit the axial zone at the second beam incoming/outgoing end.

The core and cladding layer of the non-linear (curved) waveguide according to the present invention may be made of various inorganic and organic materials, including glass and semiconductor as inorganic substance and resins as organic substance, and preferably, polymers such as resin may be used due to their processability that permits a fabrication time to be saved through the dry-etching.

The materials such as resins are more elastic than the inorganic materials such as glass and semiconductor and are advantageous in that the resultant products are tough and hardly crack. In addition to that, the cladding layer with these materials requires a reduced processing temperature and completes the etching at an accelerated speed to resultantly complete the entire waveguide manufacturing process in a reduced time, and hence, it is suitable to the mass production.

On the other hand, the material such as resins may produce a greater inherent propagation loss, compared with quartz. The inherent propagation loss is in proportion to the length of the waveguide, and therefore, the shorter waveguide is more preferable than longer ones having the similar functions. In this regard, the optical waveguide of resin can be dimensioned to relatively shorten its longitudinal extension in comparison with the prior art embodiments, and it is an advantageous choice of the material.

The polymeric materials for constituting the core and cladding layers of the polymeric optical waveguide film according to the present invention may, for instance, be polyimide resins (e.g., polyimide resins, polyimide-isoindolo-quinazolin-dione-imide resins, polyetherimide resins, polyetherketone resins, polyesterimide resins, and the like), silicone resins, acrylic resins, polystyrene resins, polycarbonate resins, polyamide resins, polyester resins, phenolic resins, polyquinolinic resins, polyquinoxaline resins, polybenzo oxazole resins, polybenzo thiazole resins, polybenzo imidazole resins, photo-bleaching resins (e.g., polysilane, silicone resins containing nitron composite, polymethyl methacrylate containing DMAPN {(4-N, N-dimethylaminophenyl)-N-phenylnitron}, dye polymer, polyimide resin or epoxy resin containing nitron composite as disclosed in Japanese Patent Preliminary Publication No. 2001-296438, and hydrolytic silane composites as disclosed in Japanese Patent Preliminary Publication No. 2000-66051, and so forth). The resins listed above may contain fluorine atoms. The polymers exceptionally preferably include polyimide resins due to their properties of high glass transition temperature (Tg) and superior thermo-resistance, and, above all, fluorine containing polyimide type resins are preferable due to their excellent permeability and desirable refractive index.

The fluorine containing polyimide type resins include fluorine containing polyimide resins, fluorine containing polyimide-isoindolo-quinazolin-dione-imide resins, fluorine containing polyetherimide resins, fluorine containing polyamide-imide resins, and the like.

A solution of a precursor for the foregoing fluorine containing polyimide type resin may be prepared through a reaction of a tetra-carboxylic acid dianhydride with a diamine carried out in a polar solvent such as N-methyl-2-pyrrolidone; N,N-dimethyl-acetamide; γ-butyrolactone; or dimethyl sulfoxide. In this respect, fluorine atoms may be contained in both or either of the tetra-carboxylic acid dianhydride and diamine.

On the other hand, a solution of a precursor for the foregoing polyimide type resin free of any fluorine atom may be prepared through a reaction of a fluorine atom-free tetra-carboxylic acid dianhydride with a fluorine atom-free diamine carried out in a polar solvent such as N-methyl-2-pyrrolidone; N,N-dimethyl-acetamide;

γ-butyro-lactone or dimethyl sulfoxide.

Specific examples of fluorine atom-containing acid dianhydrides include (tri-fluoromethyl)pyromellitic acid dianhydride; di-(trifluoromethyl)pyromellitic acid dianhydride; di-(hepta-fluoropropyl)pyromellitic acid dianhydride; penta-fluoroethyl pyromellitic acid dianhydride; bis{3,5-di-(trifluoromethyl)phenoxy}pyromellitic acid dianhydride; 2,2-bis(3,4-dicarboxy-phenyl) hexa-fluoropropane dianhydride; 5,5'-bis(tri-fluoromethyl)-3,3',4,4'-tetracarboxy-biphenyl dianhydride; 2,2',5,5'-tetrakis(trifluoro-methyl)-3,3', 4,4'-tetracarboxy-biphenyl dianhydride; 5,5'-bis(trifluoromethyl)-3,3',4,4'-tetra-carboxy-diphenyl ether dianhydride; 5,5'-bis(tri-fluoromethyl)-3,3',4,4'-tetra-carboxy-benzophenone dianhydride; bis{(trifluoromethyl) dicarboxy-phenoxy}benzene dianhydride; bis{(trifluoromethyl) dicarboxy-phenoxy}(trifluoromethyl)benzene dianhydride; bis(dicarboxy-phenoxy) (trifluoromethyl)benzene dianhydride; bis(di-carboxy-phenoxy) bis(trifluoromethyl)benzene dianhydride; bis(dicarboxy-phenoxy) tetrakis(trifluoro-methyl) benzene dianhydride; 2,2-bis{(4-(3,4-dicarboxy-phenoxy) phenyl) hexa-fluoropropane dianhydride; bis{(trifluoromethyl) dicarboxy-phenoxy}biphenyl dianhydride; bis{(trifluoromethyl) dicarboxy-phenoxy}bis(trifluoromethyl) biphenyl dianhydride; bis{(trifluoromethyl) dicarboxy-phenoxy}diphenyl ether dianhydride; and bis(dicarboxy-phenoxy) bis(trifluoromethyl) biphenyl dianhydride.

Specific examples of such fluorine atom-containing diamines are 4-(1H,1H,11H-eicosa-fluoro-undecanoxy)-1,3-diaminobenzene;
4-(1H, 1H-perfluoro-1-butanoxy)-1,3-diamino-benzene;
4-(1H, 1H-perfluoro-1-heptanoxy)-1,3-diamino-benzene;
4-(1H, 1H-perfluoro-1-octanoxy)-1,3-diamino-benzene;
4-penta-fluorophenoxy-1,3-diamino-benzene;
4-(2,3,5,6-tetrafluoro-phenoxy)-1,3-diamino-benzene;
4-(4-fluorophenoxy)-1,3-diamino-benzene;
4-(1H,1H,2H,2H-perfluoro-1-hexanoxy)-1,3-diamino-benzene;
4-(1H,1H,2H,2H-perfluoro-1-dodecanoxy)-1,3-diamino-benzene;
diamino-benzo-tri-fluoride;
bis(trifluoro-methyl)phenylene-diamine; diamino-tetra-(trifluoro-methyl)benzene;
diamino-(pentafluoro-methyl)benzene;
2,5-diamino-(perfluoro-hexyl)benzene;
2,5-diamino-(perfluoro-butyl)benzene;
2,2'-bis(trifluoromethyl)-4,4'-diaminobiphenyl;
3,3'-bis(trifluoromethyl)-4,4'-diaminobiphenyl;
octafluoro-benzidine; 4,4'-diamino-di-phenyl ether;
2,2-bis(p-aminophenyl) hexafluoro-propane; 1,3-bis(anilino) hexafluoro-propane;
1,4-bis(anilino) octafluoro-propane;
1,5-bis(anilino) decafluoro-propane;
1,7-bis(anilino) tetradeca-fluoro-propane;
2,2'-bis(trifluoromethyl)-4,4'-diamino-di-phenyl ether;
3,3'-bis(trifluoromethyl)-4,4'-diamino-diphenyl ether;
3,3',5,5'-tetrakis(tri-fluoromethyl)-4,4'-diamino-diphenyl ether;
3,3'-bis(trifluoromethyl)-4,4'-diamino-benzo-phenone;
4,4'-diamino-p-terphenyl;
1,4-bis(p-aminophenyl)benzene;
p-bis(4-amino-2-trifluoromethyl-phenoxy)benzene;
bis(amino-phenoxy)-bis(trifluoromethyl)benzene;
bis(amino-phenoxy)-tetrakis(trifluoromethyl)benzene;
2,2-bis{4-(4-amino-phenoxy)phenyl}hexafluoro-propane;
2,2-bis{4-(3-amino-phenoxy)phenyl}hexafluoro-propane;
2,2-bis{4-(2-amino-phenoxy)phenyl}hexafluoro-propane;
2,2-bis{4-(4-amino-phenoxy)-3,5-dimethyl-phenyl}hexafluoro-propane;
2,2-bis{4-(4-amino-phenoxy)-3,5-di-(trifluoro-methyl)-phenyl}hexafluoro-propane;
4,4'-bis(4-amino-2-trifluoromethyl-phenoxy) biphenyl;
4,4'-bis(4-amino-3-trifluoromethyl-phenoxy) biphenyl;
4,4'-bis(4-amino-2-tri-fluoromethyl-phenoxy) diphenyl sulfone;
4,4'-bis(3-amino-5-trifluoromethyl-phenoxy) diphenyl sulfone;
2,2-bis{4-(4-amino-3-trifluoromethyl-phenoxy) phenyl}hexafluoro-propane;
bis{(trifluoromethyl)amino-phenoxy}biphenyl;

bis[{(trifluoromethyl)amino-phenoxy}phenyl]hexafluoro-
propane;
bis{2-[(amino-phenoxy)phenyl]hexafluoro-
isopropyl}benzene; and so on.

Two or more of the composites of the tetra-carboxylic acid dianhydride and diamine may be used together. The solution of the precursor of the polyimide type resin may be used in spinning and/or printing to coat the surface of the substrate, and the coated substrate is thermally cured at the eventual temperature ranging from 200 to 400° C. so as to finish the polyimide resin coated substrate.

An additional optical waveguide or fiber is connected to receive optical signals at the end A of the first waveguide, and for that purpose, very fine adjustment permits the optimum connection between two of the waveguides with the desired high precision while a light beam is being guided from one of the waveguides to the other, by monitoring the intensity of the beam propagated through the waveguides.

The optical waveguide structure according to the present invention can mitigate the precision of axial alignment and considerably save time required for the assembling task, and this results in the reduced manufacturing cost and higher yields of the optical components.

Employing the optical waveguide structure according to the present invention, the waveguides obtained are not limited to those assembled through the aforementioned active axial alignment, but include the ones suitable as optical waveguide components that are provided with a means for passively mounting fibers, such as a V-shaped groove that is defined at the end A of the first waveguide. Such an optical waveguide dedicated to passive implementation tolerates mal-alignment of the V-shaped groove with the first waveguide, and hence, it can produce higher yields in spite of the absence somewhat of manufacturing uniformity.

In accordance with the present invention, the optical waveguide structure facilitates to fabricate parts and simplifies the assembly/adjustment of them, and it is effective to produce stable optical waveguides.

In accordance with the present invention, the optical waveguide structure enables full compensation for a deviation of the peak in the field distribution, and it is superior in reproducibility but reduced in beam loss, and can unify a branching ratio and a combining ratio with greater accuracy.

Also, in accordance with the present invention, the optical waveguide structure facilitates to fabricate parts because of their simple contours without a portion squeezed in shape, and it is effective to produce optical waveguides featuring reduced radiations in high-order mode and therefore decreased radiation loss.

BEST MODE OF IMPLEMENTING THE INVENTION

With reference to the accompanying drawings, preferred embodiments of an optical waveguide according to the present invention will now be described in terms of an application of a branching waveguide structure.

Figure 1:
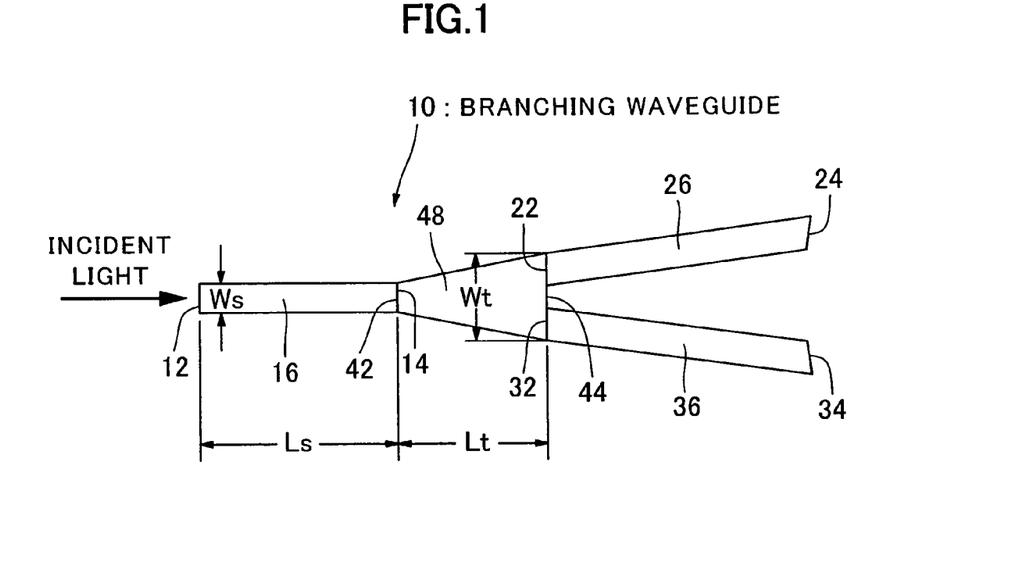
FIG. 1 is a diagram illustrating an embodiment of an optical waveguide structure according to the present invention.

A branching waveguide structure 10 is comprised of, as shown in FIG. 1, a first waveguide 16 having the opposite ends A and B denoted by numerals 12 and 14, respectively, a second waveguide 26 having the opposite ends C and D denoted by numerals 22 and 24, respectively, a third waveguide 36 having the opposite ends E and F denoted by numerals 32 and 34, respectively, and a coupling waveguide 48 having its first beam incoming/outgoing end 42 connected to the end B 14 of the first waveguide and its second beam incoming/outgoing end 44 connected to the end C 22 of the second wave and the end E 32 of the third waveguide.

The sum of lengths of the first waveguide 16 and the coupling waveguide 48 is determined so that an incident beam can transit a point of axial mal-alignment at the end A of the first waveguide and also further transit the axial zone at the second beam incoming/outgoing end of the coupling waveguide.

The longitudinal extensions of the first waveguide 16 and the coupling waveguide 48 are defined as follows:
when $L_t=450$ μm, $W_t=16$ μm, and the difference of the refractive
index of the core from that of the cladding layer equals 0.4%, $$L_s = N(10.6W_s + 147) + 6.4 \ (N=1, 2, 3, \ldots)$$

where $W_s$ and $L_s$ are respectively a core width and a length of the first waveguide 16, $L_t$ is a length of the coupling waveguide 48, and $W_t$ is a width of the core of the second beam incoming/outgoing end 44.

Simulations are carried out for both a 1×8 beam splitter with the branching waveguide according to the present invention incorporated therein and a prior art 1×8 beam splitter. In the simulation for the 1×8 beam splitter with the branching waveguide of the present invention, the optical waveguide of the present invention is positioned at the first branch stage from a single-channel input. In the simulation for the prior art 1×8 beam splitter, a beam receiving waveguide closer to the single-channel input is partially squeezed in shape.

The branching waveguide according to the present invention is shaped to be 6.5 μm in core width $W_s$ and 4×(10.6× 6.5+147)+6.4=870 μm in length $L_s$ of the first waveguide serving as a beam receiving linear waveguide, 450 μm in length $L_t$ of the coupling waveguide, and 16 μm in core width $W_t$ of the second beam incoming/outgoing end. In contrast, the prior art branching waveguide is shaped to be 6.5 μm in core width of the beam receiving linear waveguide and 3.5 μm in core width of the portion squeezed in shape. Incident beam is axially deviated by 0.5 μm.

The results of the simulations are shown in Table I below. Excessive loss of the 1×8 beam splitter of the present invention is 0.47 dB for the wavelength of 1.31 μm and 0.44 dB for the wavelength of 1.55 μm. This makes it apparent that the excessive loss is decreased compared with the prior art linear beam receiving waveguide with its part squeezed in shape.

Uniformity test also shows the similar result that the waveguide of the present invention produces a tighter range of beam intensity by 0.3 dB. From these results, it is apparent that incorporating the branching waveguide according to the present invention enables the resultant beam splitter to attain the uniformity with higher accuracy as well as the reduced loss.

TABLE I

| Samples Input | Application of the Present Invention | | Prior Art Embodiment | |
|---|---|---|---|---|
| Wavelength (μm) | Excessive Loss (dB) | Uniformity (dB) | Excessive Loss (dB) | Uniformity (dB) |
| 1.31 | 0.47 | 0.20 | 0.92 | 0.52 |
| 1.55 | 0.44 | 0.48 | 0.60 | 0.74 |

Figure 3:
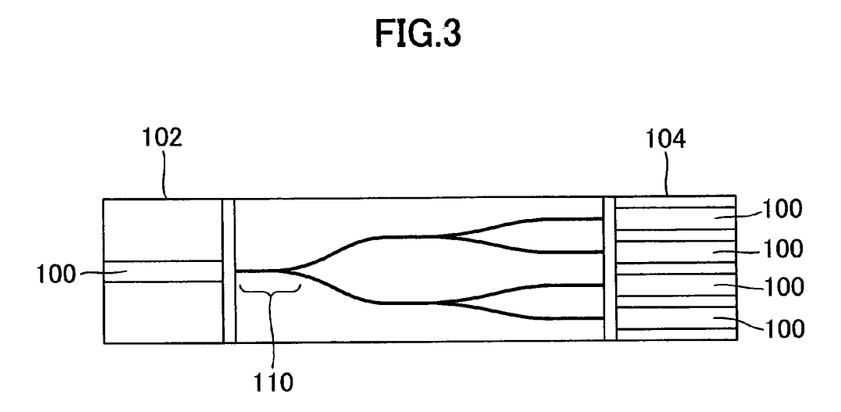
FIG. 3 is a plan view of an exemplary 1×4 beam splitter waveguide structure with V-shaped grooves, showing a branching waveguide incorporated therein according to the present invention.

An evaluation test of optical properties is carried out for a 1×4 beam splitter with the branching waveguide incorporated therein and also with V-shaped groove defined therein. The incorporated branching waveguide is configured, as can be seen in FIG. 3, to have a beam receiving unit 102 with a single lane of V-shaped groove 100, and a light emitting unit 104 with four lanes of V-shaped groove 100 where the branching waveguide 110 of the present invention is interposed in the first branching state closest to the single-channel input. For the purpose of comparison, another sample structure of linear beam receiving waveguide as in the prior art is fabricated with the same beam input and beam emitting units.

The samples are fabricated through the following steps: After forming $S_1O_2$ layer over a silicon wafer with the V-shaped groove, the wafer underwent spinning to be coated with organic zirconium chelate up to 100 Angstrom in dried film thickness. After desiccating the coated wafer, an underlying cladding layer (8 μm) and core layer (6.5 μm) of fluorine containing polyimide resin were deposited thereover. Then, silicon containing resist was laid over the core layer up to 0.5 μm in thickness and further dried, and the resultant wafer was exposed to light and developed through core pattern. The wafer further underwent reactive ion etching through a resist pattern to shape the core layer. After eliminating the resist, an upper cladding layer was deposited (15 μm), and eventually, the polyimide waveguide incorporated 1×4 beam splitter with V-shaped groove was finished.

Next, the evaluation of the 1×4 beam splitter was performed. Prior to the evaluation, fibers were passively mounted in the V-shaped groove, and the light source used was a semiconductor laser of two types of wavelength of 1.31 μm and 1.5 μm.

As a consequence, it was observed that the 1×4 beam splitter with the branching waveguide of the present invention incorporated therein was 7.31 dB in insertion loss and 0.41 dB in uniformity for the wavelength of 1.31 μm and 7.19 dB in insertion loss and 0.33 dB in uniformity for the wavelength of 1.55 μm. On the other hand, the prior art structure of the 1×4 beam splitter is 7.87 dB in insertion loss and 0.79 dB in uniformity for the wavelength of 1.31 μm, and 765 dB in insertion loss and 0.47 dB in uniformity for the wavelength of 1.55 μm. Thus, incorporating the branching waveguide according to the present invention enables the resultant device to implement the properties of greater uniformity and reduced loss, compared with the prior art structure.

Another embodiment of the present invention will now be described. The 1×4 beam splitter of the present invention is interposed in the first branching stage closer to a single-channel input. In this application, the core width $W_s$ is 6.7 μm, that of the second beam incoming/outgoing end $W_t$ is 16 μm, the combined length L is 1330 μm, the length of the coupling waveguide $L_t$ is 450 μm, and the length of the first waveguide $L_s$ is 880 μm. For the comparison sample, assumed herein is an additional 1×4 beam splitter of 480 μm in length where $W_t$ is 6.5 μm and $L_s$ is arbitrary, so as to perform simulations.

For the simulations, two-dimensional beam propagation method is used. Incident beam was intentionally axially deviated by 0.5 μm. The results of the simulations are given in Table II below. As will be recognized in Table II, the 1×4 beam splitter of the present invention, even if receiving incident beam axially deviated as much as 0.5 μm, loss at four-channel output varies not so much from one another, and the uniformity is retained. In another sample prepared with $L_s$ of an arbitrary value regardless of the present invention, the variation due to the loss from one channel to another is significant, and it is hard to retain the uniformity. Allowing for this, it is apparent that incorporating the branching waveguide of the present invention enables the resultant beam splitter to retain the uniformity with greater accuracy as well as to reduce the loss.

TABLE II

| Samples Input | Application of the Present Invention | | Prior Art Embodiment | |
|---|---|---|---|---|
| Wavelength (μm) | Excessive Loss (dB) | Uniformity (dB) | Excessive Loss (dB) | Uniformity (dB) |
| 1.31 | 0.38 | 0.04 | 0.50 | 0.72 |
| 1.55 | 0.36 | 0.05 | 0.50 | 1.49 |

Figure 4:
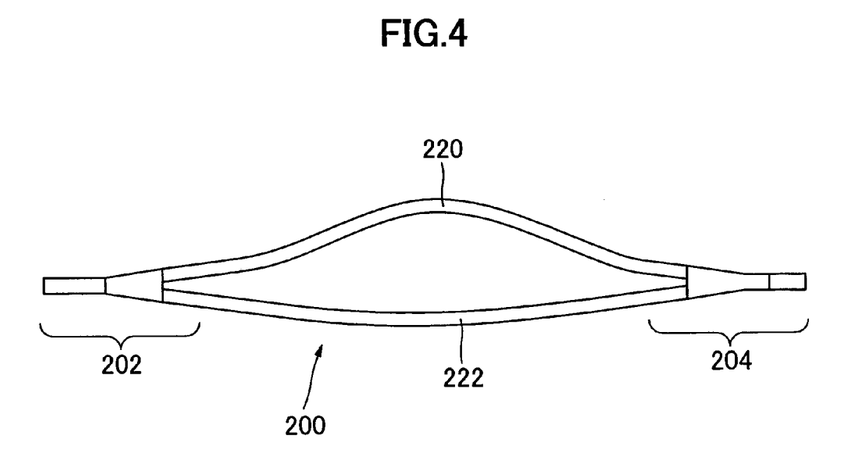
FIG. 4 is a plan view of an exemplary Mach-Zehnder interferometer waveguide structure, showing the branching waveguide incorporated therein according to the present invention.

Besides the beam splitter, the branching waveguide according to the present invention can be incorporated in an optical device such as a Mach-Zehnder interferometer optical waveguide that is required to have a branching structure and highly precisely unify output beam intensity. A Mach-Zehnder interferometer optical waveguide 200 is, as shown in FIG. 4, comprised of two of the optical waveguides of the present invention; that is, one of them is a branching waveguide 202 and the other is a combining waveguide 204. Such an interferometer waveguide also includes optical waveguides 220 and 222 different in length from each other. The waveguide 220 has one of its opposite ends serving as one of beam outgoing waveguides of the branching waveguide 202 and the other end serving as one of beam incoming waveguides of the combining waveguide 204. The other waveguide 222 has one of its opposite ends serving as the other beam outgoing waveguide of the branching waveguide 202 and the other end serving as the other beam incoming waveguide of the combining waveguide 204.

Figure 5:
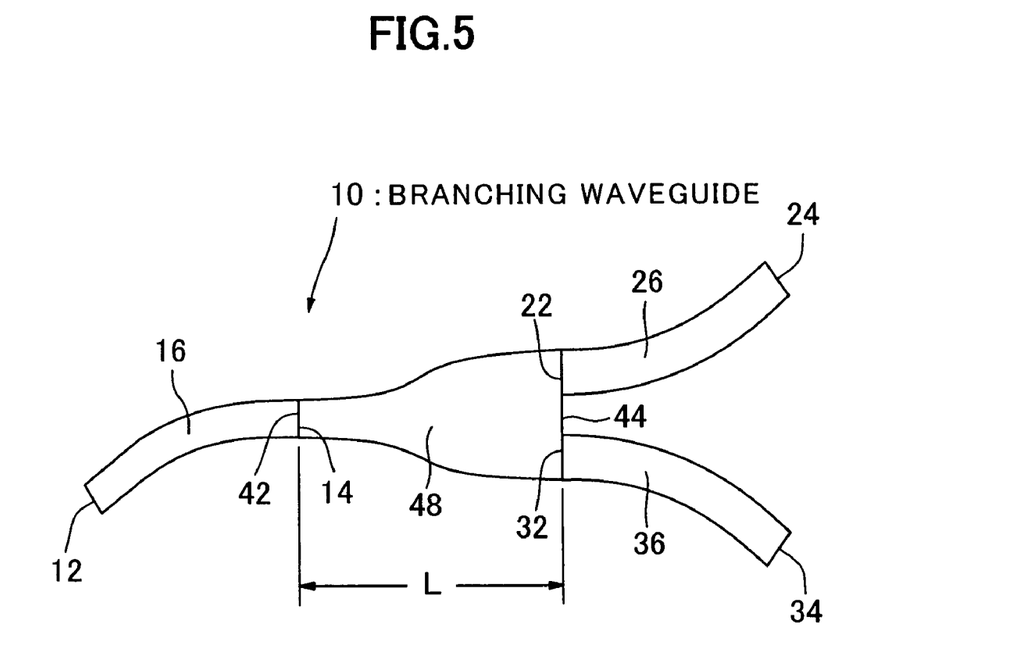
FIG. 5 is a diagram illustrating another embodiment of the optical waveguide structure according to the present invention.

Still another embodiment of the optical waveguide structure according to the present invention will now be described. A branching waveguide structure 10 is comprised of, as shown in FIG. 5, a first non-linear waveguide 16 having the opposite ends A and B denoted by numerals 12 and 14, respectively, a second non-linear waveguide 26 having the opposite ends C and D denoted by numerals 22 and 24, respectively, a third non-linear waveguide 36 having the opposite ends E and F denoted by numerals 32 and 34, respectively, and a coupling waveguide 48 having its first beam incoming/outgoing end 42 connected to the end B 14 of the first waveguide and its second beam incoming/outgoing end 44 connected to the end C 22 of the second wave and the end E 32 of the third waveguide.

A length L of the combining waveguide 48 is determined so that an incident beam at its peak of intensity can transit a point of axial mal-alignment at the beam incoming/outgoing end 42 and further transit the axial zone at the second beam incoming/outgoing end 44. For instance, as with a beam splitter application where a curved waveguide is connected to a combining waveguide, incorporating the combining waveguide according to the present invention enables the resultant beam splitter to unify a branching ratio of a light beam with greater accuracy as well as to reduce optical loss.

The invention claimed is:

1. A method of making an optical waveguide structure having a first waveguide provided with the opposite ends A and B, a second waveguide with the opposite ends C and D, a third waveguide with the opposite ends E and F, and a coupling waveguide having its first beam incoming/outgoing end connected to the end B of the first waveguide and its second beam incoming/outgoing end connected to the end C of the second waveguide and the end E of the third waveguide, the method comprising a step of:

longitudinally dimensioning the first waveguide and the coupling waveguide so that a peak component in intensity of a beam of light can abaxially transit the end A of the first waveguide while the peak component in intensity of the beam of light containing optical components in high-order modes can transit the second beam incoming/outgoing end of the coupling waveguide on and along its axis.

2. The method according to claim 1, wherein the step of longitudinally dimensioning the first waveguide and the coupling waveguide includes a step of longitudinally dimensioning the first and coupling waveguides so that a light beam of which wavelength is the shortest of all the wavelengths used for a communication, when it is at its peak, can abaxially transit the end A of the first waveguide and further transit the second beam incoming/outgoing end of the coupling waveguide on and along its axis.

3. The method according to claim 1, wherein the optical waveguide structure functions as a branching waveguide.

4. The method according to claim 1, wherein the optical waveguide structure functions as a combining waveguide.

5. The method according to claim 1, wherein the optical waveguide structure is a resin waveguide.

6. The method according to claim 1, wherein the optical waveguide structure includes a waveguide substrate with a V-shaped groove(s) defined therein.

7. An optical waveguide structure, comprising a first non-linear waveguide provided with the opposite ends A and B, a second non-linear waveguide with the opposite ends C and D, a third non-linear waveguide with the opposite ends E and F, and a coupling waveguide having its first beam incoming/outgoing end connected to the end B of the first waveguide and its second beam incoming/outgoing end connected to the end C of the second waveguide and the end E of the third waveguide, the coupling waveguide having its longitudinal extension dimensioned so that a single peak component in intensity of a beam of light can abaxially transit the first beam incoming/outgoing end and further transit the second beam incoming/outgoing end of the coupling waveguide on and along its axis.

8. A method of making an optical waveguide structure having a first waveguide provided with the opposite ends A and B, a second waveguide with the opposite ends C and D, a third waveguide with the opposite ends E and F, and a coupling waveguide having its first beam incoming/outgoing end connected to the end B of the first waveguide and its second beam incoming/outgoing end connected to the end C of the second waveguide and the end E of the third waveguide, the method comprising a step of:

longitudinally dimensioning the first waveguide and the coupling waveguide so that a single peak component in intensity of a beam of light can abaxially transit the end A of the first waveguide and the first beam incoming/outgoing end and further transit the second beam incoming/outgoing end of the coupling waveguide on and along its axis.

9. The method according to claim 8, wherein the step of longitudinally dimensioning the first waveguide and the coupling waveguide includes a step of longitudinally dimensioning the first and coupling waveguide so that a light beam of which wavelength is the shortest of all the wavelengths used for a communication, when it is at its peak, can abaxially transit the end A of the first waveguide and further transit the second beam incoming/outgoing end of the coupling waveguide on and along its axis.

10. The method according to claim 8, wherein the optical waveguide structure functions as a branching waveguide.

11. The method according to claim 8, wherein the optical waveguide structure functions as a combining waveguide.

12. The method according to claim 8, wherein the optical waveguide structure is a resin waveguide.

13. The method according to claim 8, wherein the optical waveguide structure includes a waveguide substrate with a V-shaped groove(s) defined therein.

14. The method according to claim 8, wherein the step of longitudinally dimensioning the first waveguide and the coupling waveguide includes a step of longitudinally dimensioning the first and coupling waveguides so that a light beam of either a first or second wavelength, when it is at its peak of light intensity, can transit a point of axial mal-alignment at the end A of the first waveguide and further transit the axial zone at the second beam incoming/outgoing end of the coupling waveguide.

15. The method according to claim 8, wherein the first waveguide is greater in core width than the second and third waveguides.

16. An optical waveguide structure, comprising a first waveguide provided with the opposite ends A and B, a second waveguide with the opposite ends C and D, a third waveguide with the opposite ends E and F, and a coupling waveguide having its first beam incoming/outgoing end connected to the end B of the first waveguide and its second beam incoming/outgoing end connected to the end C of the second waveguide and the end E of the third waveguide, the first waveguide and the coupling waveguide being longitudinally dimensioned so that a peak component in intensity of a beam of light can abaxially transit the end A of the first waveguide while the peak component in intensity of the beam of light containing optical components in high-order modes can transit the second beam incoming/outgoing end of the coupling waveguide on and along its axis, and wherein the longitudinal extension of the first waveguide is defined by the following equations:

when $L_t=450$ μm, $W_t=16$ μm, and the difference of the refractive index of the core from that of the cladding layer equals 0.4%, $$L_s = N(10.6W_s + 147) + 6.4 \; (N=1, 2, 3, 4)$$

where $W_s$ and $L_s$ are respectively a core width and a length of the first waveguide, $L_t$ is a length of the coupling waveguide, and $W_t$ is a width of the core of the second beam incoming/outgoing end.

17. An optical waveguide structure, comprising a first waveguide provided with the opposite ends A and B, a second waveguide with the opposite ends C and D, a third waveguide with the opposite ends E and F, and a coupling waveguide having its first beam incoming/outgoing end connected to the end B of the first waveguide and its second beam incoming/outgoing end connected to the end C of the second waveguide and the end E of the third waveguide, the first waveguide and the coupling waveguide being longitudinally dimensioned so that a single peak component in intensity of a beam of light can abaxially transit the end A of the first waveguide while the single peak component in intensity of the beam of light containing optical components in high-order modes can transit at least the second beam incoming/outgoing end of the coupling waveguide on and along its axis, and wherein the longitudinal extension of the first waveguide is defined by the following equations:

when $L_t=450$ μm and the difference of the refractive index of the core from that of the cladding layer equals 0.4%, $$L_s = N(10.6W_s+147)-12.6W_t+208 \ (N=1, 2, 3, 4)$$

where $W_s$ and $L_s$ are respectively a core width and a length of the first waveguide, $L_t$ is a length of the coupling waveguide, and $W_t$ is a width of the core of the second beam incoming/outgoing end.

18. An optical waveguide structure, comprising a first waveguide provided with the opposite ends A and B, a second waveguide with the opposite ends C and D, a third waveguide with the opposite ends E and F, and a coupling waveguide having its first beam incoming/outgoing end connected to the end B of the first waveguide and its second beam incoming/outgoing end connected to the end C of the second waveguide and the end E of the third waveguide, the first waveguide and the coupling waveguide being longitudinally dimensioned so that a single peak component in intensity of a beam of light can abaxially transit the end A of the first waveguide while the single peak component in intensity of the beam of light containing optical components in high-order modes can transit at least the second beam incoming/outgoing end of the coupling waveguide on and along its axis, and wherein the total longitudinal extension of the first waveguide and the coupling waveguide is given by the following equations:

when the difference of the refractive index of the core from that of the cladding layer equals 0.4%, $$L = N(10.6W_s+147)-12.6W_t+658 \ (N=1, 2, 3, 4) \text{ and}$$

$$L = L_s + L_t$$

where $W_s$ and $L_s$ are respectively a core width and a length of the first waveguide, $L_t$ is a length of the coupling waveguide, and $W_t$ is a width of the core of the second beam incoming/outgoing end.

19. An optical waveguide structure, comprising a first waveguide provided with the opposite ends A and B, a second waveguide with the opposite ends C and D, a third waveguide with the opposite ends E and F, and a coupling waveguide having its first beam incoming/outgoing end connected to the end B of the first waveguide and its second beam incoming/outgoing end connected to the end C of the second waveguide and the end E of the third waveguide, the first waveguide and the coupling waveguide being longitudinally dimensioned so that a single peak component in intensity of a beam of light can abaxially transit the end A of the first waveguide while the single peak component in intensity of the beam of light containing optical components in high-order modes can transit at least the second beam incoming/outgoing end of the coupling waveguide on and along its axis, and wherein the longitudinal extension of the first waveguide is defined by the following equations:

when $L_t=450$ μm, $W_t=16$ μm, and the difference of the refractive index of the core from that of the cladding layer equals 0.4%, $$L_s = N(32.5W_s^2-415W_s+1540)+6.4 \ (N=1, 2, 3, 4)$$

where $W_s$ and $L_s$ are respectively a core width and a length of the first waveguide, $L_t$ is a length of the coupling waveguide, and $W_t$ is a width of the core of the second beam incoming/outgoing end.

20. An optical waveguide structure, comprising a first waveguide provided with the opposite ends A and B, a second waveguide with the opposite ends C and D, a third waveguide with the opposite ends E and F, and a coupling waveguide having its first beam incoming/outgoing end connected to the end B of the first waveguide and its second beam incoming/outgoing end connected to the end C of the second waveguide and the end E of the third waveguide, the first waveguide and the coupling waveguide being longitudinally dimensioned so that a single peak component in intensity of a beam of light can abaxially transit the end A of the first waveguide while the single peak component in intensity of the beam of light containing optical components in high-order modes can transit at least the second beam incoming/outgoing end of the coupling waveguide on and along its axis, and wherein the longitudinal extension of the first waveguide is given by the following equations:

when $L_t=450$ μm and the difference of the refractive index of the core from that of the cladding layer equals 0.4%, $$L_s = N(32.5W_s^2-415W_s+1540)-12.6W_t+208 \ (N=1, 2, 3, 4)$$

where $W_s$ and $L_s$ are respectively a core width and a length of the first waveguide, $L_t$ is a length of the coupling waveguide, and $W_t$ is a width of the core of the second beam incoming/outgoing end.

21. An optical waveguide structure, comprising a first waveguide provided with the opposite ends A and B, a second waveguide with the opposite ends C and D, a third waveguide with the opposite ends E and F, and a coupling waveguide having its first beam incoming/outgoing end connected to the end B of the first waveguide and its second beam incoming/outgoing end connected to the end C of the second waveguide and the end E of the third waveguide, the first waveguide and the coupling waveguide being longitudinally dimensioned so that a single peak component in intensity of a beam of light can abaxially transit the end A of the first waveguide while the single peak component in intensity of the beam of light containing optical components in high-order modes can transit at least the second beam incoming/outgoing end of the coupling waveguide on and along its axis, and wherein the total longitudinal extension of the first waveguide and the coupling waveguide is given by the following equations:

when the difference of the refractive index of the core from that of the cladding layer equals 0.4%, $$L = N(32.5W_s^2-415W_s+1540)-12.6W_t+658 \ (N=1, 2, 3, 4) \text{ and}$$

$$L = L_s + L_t$$

where $W_s$ and $L_s$ are respectively a core width and a length of the first waveguide, $L_t$ is a length of the coupling waveguide, and $W_t$ is a width of the core of the second beam incoming/outgoing end.

22. An optical waveguide structure, comprising a first waveguide provided with the opposite ends A and B, a second waveguide with the opposite ends C and D, a third waveguide with the opposite ends E and F, and a coupling waveguide having its first beam incoming/outgoing end connected to the end B of the first waveguide and its second beam incoming/outgoing end connected to the end C of the second waveguide and the end E of the third waveguide, the first waveguide and the coupling waveguide being longitudinally dimensioned so that a single peak component in intensity of a beam of light can abaxially transit the end A of the first waveguide and the first beam incoming/outgoing end and further transit the second beam incoming/outgoing end of the coupling waveguide on and along its axis, and wherein the longitudinal extension of the first waveguide is defined by the following equations:

when $L_t$=450 μm, $W_t$=16 μm, and the difference of the refractive index of the core from that of the cladding layer equals 0.4%, $$L_s=N(10.6W_s+147)+6.4 \; (N=1, 2, 3, 4)$$

where $W_s$ and $L_s$ are respectively a core width and a length of the first waveguide, $L_t$ is a length of the coupling waveguide, and $W_t$ is a width of the core of the second beam incoming/outgoing end.

23. An optical waveguide structure, comprising a first waveguide provided with the opposite ends A and B, a second waveguide with the opposite ends C and D, a third waveguide with the opposite ends E and F, and a coupling waveguide having its first beam incoming/outgoing end connected to the end B of the first waveguide and its second beam incoming/outgoing end connected to the end C of the second waveguide and the end E of the third waveguide, the first waveguide and the coupling waveguide being longitudinally dimensioned so that a single peak component in intensity of a beam of light can abaxially transit the end A of the first waveguide and the first beam incoming/outgoing end and further transit the second beam incoming/outgoing end of the coupling waveguide on and along its axis, and wherein the longitudinal extension of the first waveguide is defined by the following equations:

when $L_t$=450 μm and the difference of the refractive index of the core from that of the cladding layer equals 0.4%, $$L_s=N(10.6W_s+147)-12.6W_t+208 \; (N=1, 2, 3, 4)$$

where $W_s$ and $L_s$ are respectively a core width and a length of the first waveguide, $L_t$ is a length of the coupling waveguide, and $W_t$ is a width of the core of the second beam incoming/outgoing end.

24. An optical waveguide structure, comprising a first waveguide provided with the opposite ends A and B, a second waveguide with the opposite ends C and D, a third waveguide with the opposite ends E and F, and a coupling waveguide having its first beam incoming/outgoing end connected to the end B of the first waveguide and its second beam incoming/outgoing end connected to the end C of the second waveguide and the end E of the third waveguide, the first waveguide and the coupling waveguide being longitudinally dimensioned so that a single peak component in intensity of a beam of light can abaxially transit the end A of the first waveguide and the first beam incoming/outgoing end and further transit the second beam incoming/outgoing end of the coupling waveguide on and along its axis, and wherein the total longitudinal extension of the first waveguide and the coupling waveguide is given by the following equations:

when the difference of the refractive index of the core from that of the cladding layer equals 0.4%, $$L=N(10.6W_s+147)-12.6W_t+658 \; (N=1, 2, 3, 4) \text{ and}$$

$$L=L_s+L_t$$

where $W_s$ and $L_s$ are respectively a core width and a length of the first waveguide, $L_t$ is a length of the coupling waveguide, and $W_t$ is a width of the core of the second beam incoming/outgoing end.

25. An optical waveguide structure, comprising a first waveguide provided with the opposite ends A and B, a second waveguide with the opposite ends C and D, a third waveguide with the opposite ends E and F, and a coupling waveguide having its first beam incoming/outgoing end connected to the end B of the first waveguide and its second beam incoming/outgoing end connected to the end C of the second waveguide and the end E of the third waveguide, the first waveguide and the coupling waveguide being longitudinally dimensioned so that a single peak component in intensity of a beam of light can abaxially transit the end A of the first waveguide and the first beam incoming/outgoing end and further transit the second beam incoming/outgoing end of the coupling waveguide on and along its axis, and wherein the longitudinal extension of the first waveguide is defined by the following equations:

when $L_t$=450 μm, $W_t$=16 μm, and the difference of the refractive index of the core from that of the cladding layer equals 0.4%, $$L_s=N(32.5W_s^2-415W_s+1540)+6.4 \; (N=1, 2, 3, 4)$$

where $W_s$ and $L_s$ are respectively a core width and a length of the first waveguide, $L_t$ is a length of the coupling waveguide, and $W_t$ is a width of the core of the second beam incoming/outgoing end.

26. An optical waveguide structure, comprising a first waveguide provided with the opposite ends A and B, a second waveguide with the opposite ends C and D, a third waveguide with the opposite ends E and F, and a coupling waveguide having its first beam incoming/outgoing end connected to the end B of the first waveguide and its second beam incoming/outgoing end connected to the end C of the second waveguide and the end E of the third waveguide, the first waveguide and the coupling waveguide being longitudinally dimensioned so that a single peak component in intensity of a beam of light can abaxially transit the end A of the first waveguide and the first beam incoming/outgoing end and further transit the second beam incoming/outgoing end of the coupling waveguide on and along its axis, and wherein the longitudinal extension of the first waveguide is given by the following equations:

when $L_t$=450 μm and the difference of the refractive index of the core from that of the cladding layer equals 0.4%, $$L_s=N(32.5W_s^2-415W_s+1540)-12.6W_t+208 \; (N=1, 2, 3, 4)$$

where $W_s$ and $L_s$ are respectively a core width and a length of the first waveguide, $L_t$ is a length of the coupling waveguide, and $W_t$ is a width of the core of the second beam incoming/outgoing end.

27. An optical waveguide structure, comprising a first waveguide provided with the opposite ends A and B, a second waveguide with the opposite ends C and D, a third waveguide with the opposite ends E and F, and a coupling waveguide having its first beam incoming/outgoing end connected to the end B of the first waveguide and its second beam incoming/outgoing end connected to the end C of the second waveguide and the end E of the third waveguide, the first waveguide and the coupling waveguide being longitudinally dimensioned so that a single peak component in intensity of a beam of light can abaxially transit the end A of the first waveguide and the first beam incoming/outgoing end and further transit the second beam incoming/outgoing end of the coupling waveguide on and along its axis, and wherein the total longitudinal extension of the first waveguide and the coupling waveguide is given by the following equations:

when the difference of the refractive index of the core from that of the cladding layer equals 0.4%, $$L=N(32.5W_s^2-415W_s+1540)-12.6W_t+658 \text{ (N=1, 2, 3, 4) and}$$

$$L=L_s+L_t$$

where $W_s$ and $L_s$ are respectively a core width and a length of the first waveguide, $L_t$ is a length of the coupling waveguide, and $W_t$ is a width of the core of the second beam incoming/outgoing end.

28. A method of making an optical waveguide structure having a first waveguide provided with the opposite ends A and B, a second waveguide with the opposite ends C and D, a third waveguide with the opposite ends E and F, and a coupling waveguide having its first beam incoming/outgoing end connected to the end B of the first waveguide and its second beam incoming/outgoing end connected to the end C of the second waveguide and the end E of the third waveguide, the method comprising a step of:

longitudinally dimensioning the first waveguide and the coupling waveguide so that a single peak component in intensity of a beam of light can abaxially transit the end A of the first waveguide and further transit the second beam incoming/outgoing end of the coupling waveguide on and along its axis.

29. The method according to claim 28, wherein the step of longitudinally dimensioning the first waveguide and the coupling waveguide includes a step of longitudinally dimensioning the first and coupling waveguides so that a light beam of either a first or second wavelength, when it is at its peak of light intensity, can transit a point of axial mal-alignment at the end A of the first waveguide and further transit the axial zone at the second beam incoming/outgoing end of the coupling waveguide.

30. The method according to claim 28, wherein the first waveguide is greater in core width than the second and third waveguides.

31. The method according to claim 28, wherein the step of longitudinally dimensioning the first waveguide and the coupling waveguide includes a step of longitudinally dimensioning the first and coupling waveguides so that a light beam of which wavelength is the shortest of all the wavelengths used for a communication, when it is at its peak, can abaxially transit the end A of the first waveguide and further transit the second beam incoming/outgoing end of the coupling waveguide on and along its axis.

32. The method according to claim 28, wherein the optical waveguide structure functions as a branching waveguide.

33. The method according to claim 28, wherein the optical waveguide structure functions as a combining waveguide.

34. An optical waveguide structure, comprising a first waveguide provided with the opposite ends A and B, a second waveguide with the opposite ends C and D, a third waveguide with the opposite ends E and F, and a coupling waveguide having its first beam incoming/outgoing end connected to the end B of the first waveguide and its second beam incoming/outgoing end connected to the end C of the second waveguide and the end E of the third waveguide, the first waveguide and the coupling waveguide being longitudinally dimensioned so that a single peak component in intensity of a beam of light can abaxially transit the end A of the first waveguide and further transit the second beam incoming/outgoing end of the coupling waveguide on and along its axis, and wherein the longitudinal extension of the first waveguide is defined by the following equations:

when $L_t$=450 μm, $W_t$=16 μm, and the difference of the refractive index of the core from that of the cladding layer equals 0.4%, $$L_s=N(10.6 W_s+147)+6.4 \text{ (N1, 2, 3, 4)}$$

where $W_s$ and $L_s$ are respectively a core width and a length of the first waveguide, $L_t$ is a length of the coupling waveguide, and $W_t$ is a width of the core of the second beam incoming/outgoing end.

35. The method according to claim 28, wherein the optical waveguide structure is a resin waveguide.

36. The method according to claim 28, wherein the optical waveguide structure includes a waveguide substrate with a V-shaped groove(s) defined therein.

* * * * *